United States Patent

[11] 3,568,849

| [72] | Inventor | James M. Hutchison<br>Deptford, England |
|---|---|---|
| [21] | Appl. No. | 791,934 |
| [22] | Filed | Jan. 17, 1969 |
| [45] | Patented | Mar. 9, 1971 |
| [73] | Assignee | Molins Machine Company Limited<br>London, England |
| [32] | Priority | Jan. 31, 1968 |
| [33] | | Great Britain |
| [31] | | 4909/68 |

[54] TOOLHOLDING DEVICES
1 Claim, 3 Drawing Figs.

[52] U.S. Cl. .................................................. 211/60,
29/568, 279/79
[51] Int. Cl. .................................................. B23q 13/00
[50] Field of Search .......................................... 211/60 (T),
60, 69, 62 (U.S.), 69.5, 69.8, 1.5 (Last Foreign), 8
(Last U.S.); 248/314; 206/17, 17.5; 29/568;
269/16; 306/(Inquired); 285/345; 287/126 (last 2
U.S.); 279/123 (P), 24, 76, 97 (U.S.)

[56] References Cited
UNITED STATES PATENTS

| 2,320,360 | 6/1943 | Grey.............................. | 279/79 |
| 2,650,570 | 9/1953 | Voelcker...................... | 211/69.5 |
| 3,191,260 | 6/1965 | Jorgensen..................... | 29/568UX |
| 3,286,344 | 11/1966 | Brainard........................ | 211/1.5UX |
| 3,431,635 | 3/1969 | Balding ........................ | 29/568 |

FOREIGN PATENTS

| 269,582 | 7/1950 | Switzerland.................. | 279/76 |

Primary Examiner—Roy D. Frazier
Assistant Examiner—Abraham Frankel
Attorney—Emory L. Graff & Emory L. Graff, Jr.

ABSTRACT: A cutting tool is held in a carrier having a circumferential groove. The tool and the carrier are retained in an annular member by means of pin elements in the annular member which are spring loaded inwards into the groove. A plurality of such annular members are carried in a tool magazine.

3,568,849

TOOLHOLDING DEVICES

This invention concerns improvements in or relating to toolholding devices.

In U.S. Pat. Nos. RE25,956 and 3,241,451 there is disclosed an arrangement for changing the cutting tool in the spindle of a numerically controlled machine tool wherein the spindle is aligned with a selected position in a tool magazine and withdraws a tool therefrom, and after such tool has been used for machining, is realigned with said selected position to replace the tool in the magazine, and is then aligned with a further selected position in the magazine to receive a further too. The machine tool spindle grips each tool by its shank, i.e. the end opposed to its cutting end, and each tool is received and held in the magazine by its cutting end so that the shank end projects from the magazine and can be received by the spindle. With such an arrangement it is necessary that the tools are held in the tool magazine sufficiently firmly to prevent their falling therefrom, but so that they can be removed from and replaced in the tool tool magazine by the spindle. It is further necessary that the tools are held in the magazine so that their projecting shanks are positioned with sufficient accuracy to enable the spindle to receive the tools under data control. The tool magazine must therefore be provided with toolholding devices which meet these requirements.

In this specification the term "tool" is intended to mean not only the actual cutting tool itself but also such a tool together with a carrier in which the tool is carried both in the magazine and in the spindle. Such an arrangement of tool and tool carrier is disclosed in U.S. Pat. Application Ser. No. 775,478 filed Nov. 13, 1968.

According to the present invention there is provided a toolholding device comprising a first part in the form of an annular member adapted to receive a second part on a tool to be held, an element housed in one of the parts and adapted to engage in a recess in the other part to retain the tool in the annular member, and resilient means to urge the element in the direction to engage in the recess. Where the tool is carried in a tool carrier the recess may be provided on the tool carrier. Preferably a plurality of spring-loaded elements are provided to engage in said recess and thereby retain the tool in said member.

By this arrangement the tool can be inserted axially into said member, said element or elements being urged against the action of the resilient means until said recess registers with said element or elements whereupon the element or elements, urged by said resilient means, engage in said recess to retain the tool in the member. The tool can be withdrawn axially from said member, the surface defining said recess coacting with said element or elements to force the element or elements outwardly thereby to release the tool.

A plurality of such toolholding devices may be provided on a tool magazine.

A toolholding device in accordance with the invention will now be described, by way of example, with reference to the accompanying drawing, in which.

Figure 1:
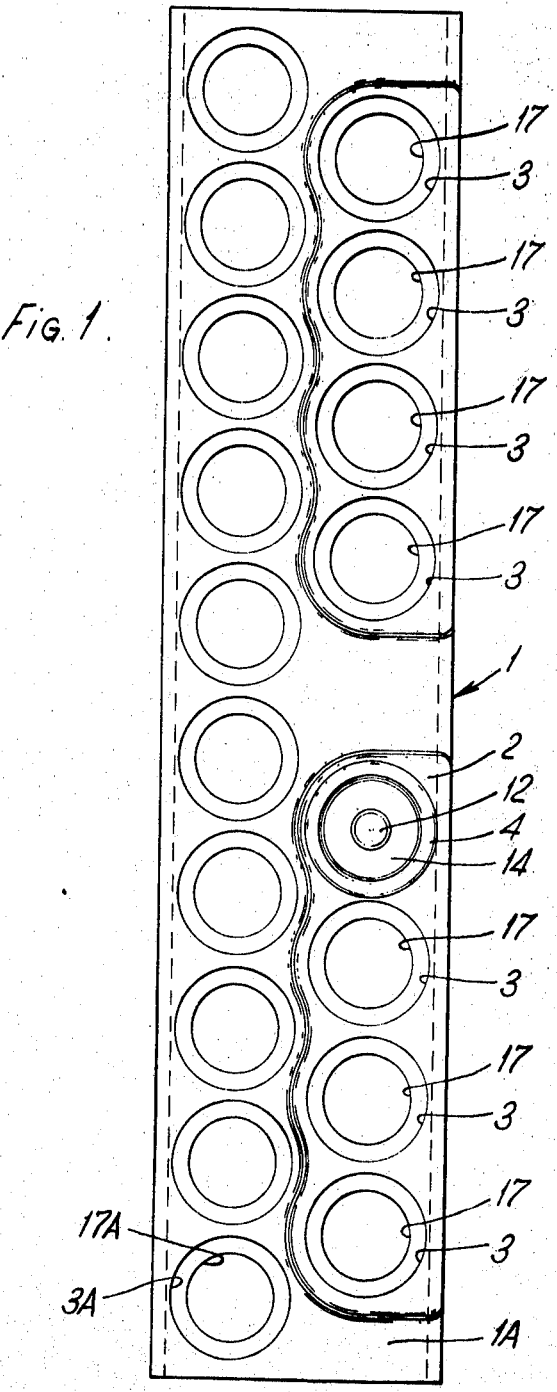
FIG. 1 is a plan view of a tool magazine.
Figure 2:
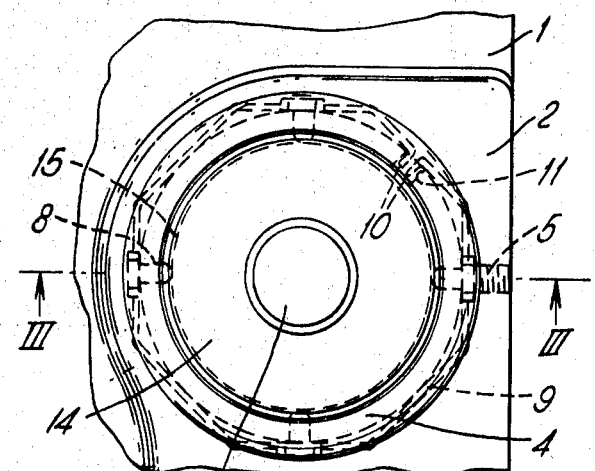
FIG. 2 is a plan view of part of the tool magazine of FIG. 1 to a larger scale.

A tool magazine 1 has a base 1A and two projecting parts 2 in each of which are provided four holes 3. There are also 10 other holes 3A in the base 1A. An annular toolholding member 4 has a lower cylindrical part which is shown fitted into one of the holes 3 and retained therein by a grub screw 5 threaded through the part 2 and engaging in a V-groove 6 in the periphery of the member 4.

The upper portion of the member 4 has an internal cylindrical surface 7 from which four pins 8, housed in the member 4, are urged to project by a spring 9 of polygonal form. The spring 9 surrounds the member 4 and is located in a slot in the head of each pin 8 to urge the pin inwardly, the ends 10 of the spring being bent inwardly to locate in a hole 11 in the member 4.

A tool to be held in the magazine comprises a shank portion 12, a cutting portion 13, and a projecting disc portion 14 of greater diameter than the cutting portion 13. The disc portion 14 has a peripheral groove 15 in which the pins 8 can engage, the diameter of the disc portion 14 being slightly less than that of the hole defined by the cylindrical surface 7 so that the disc can be received in the hole. The upper and lower edges of the disc portion 14 are chamfered. The diameter of the cutting portion 13 of the tool is slightly less than that of a hole 16 in the lower part of the member 4 so that the cutting portion can be received in the hole. The magazine 1 has a hole 17 below the hole 16 and has a recess 18 in its base.

Figure 3:
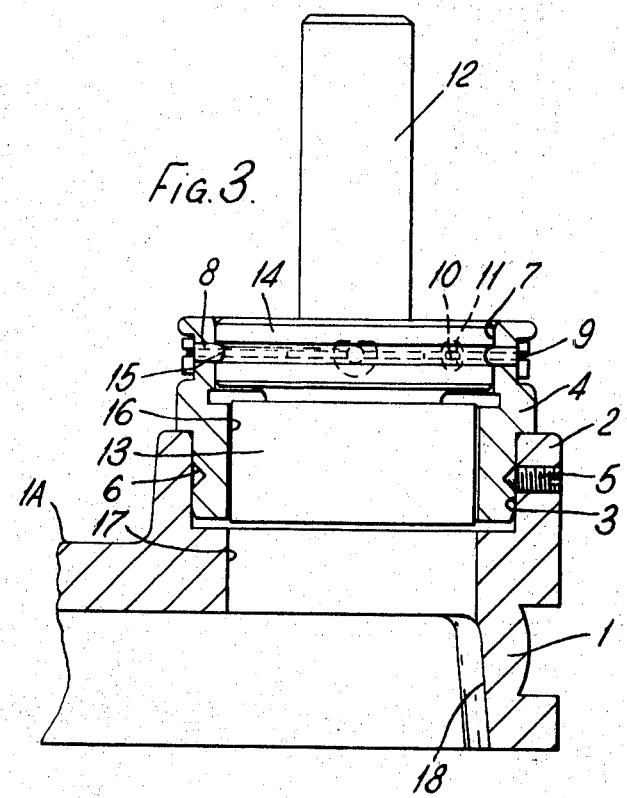
FIG. 3 is a sectional view on the line 14 III –III of FIG. 2.

The tool is inserted axially into the holding member 4 and as the lower chamfered edge of the disc portion 14 engages the inwardly projecting pins 8, the pins are forced outwardly against the action of the spring 9 and are held out until the groove 15 registers with the pins. The pins, under the spring action, then locate in the groove to retain the tool in the holder with its shank portion 12 projecting therefrom. When the tool is removed from the holder, its shank portion 12 is gripped and moved upwardly, as viewed in FIG. 3, whereupon the surface defining the groove 15 coacts with the ends of the pins 8 to force the pins outwardly, thereby enabling the tool to be withdrawn.

The magazine 1 as shown in FIG. 1 has only the one toolholder 4 and tool inserted in one of the holes 3. It will be appreciated that, in practice, the other holes 3 will also carry a toolholder and tool.

The other holes 3A are also stepped to have a smaller diameter portion 17A and will contain similar toolholders and tools with longer shanks.

The internal diameters and proportions of the toolholders may vary to accommodate tools with different size cutting portions.

A toolholding device as described above with reference to the accompanying drawing can advantageously be used with a numerically controlled machine tool as described in the first-mentioned specification.

I claim:

1. A tool magazine comprising means defining a plurality of cylindrical apertures, an externally stepped cylindrical toolholder having a lower portion inserted in one of the cylindrical apertures of the tool magazine, and an upper and larger diameter portion resting on the edge of the means defining the aperture, the toolholder having an internal stepped cylindrical aperture with a cutting tool received therein, the tool having a cylindrical portion of greater diameter than its cutting portion, the aperture in the toolholder having a lower portion receiving the cutting portion of the tool, and an upper and larger diameter portion receiving the said cylindrical portion of the tool, the cylindrical portion of the tool having a circumferential recess therein, a plurality of radial pins passing through the toolholder, the outer ends of the pins each having a horizontal slot, a polygonal wire spring embracing the pins and passing through each of the slots to urge the pins radially inwards to engage in the circumferential recess in the cylindrical portion of said tool, the spring having two ends facing radially inwards and each inserted in a radial retaining hole in the toolholder.